United States Patent
Tanimichi

(10) Patent No.: US 11,827,227 B2
(45) Date of Patent: Nov. 28, 2023

(54) VEHICLE CONTROL APPARATUS

(71) Applicant: HITACHI AUTOMOTIVE SYSTEMS, LTD., Hitachinaka (JP)

(72) Inventor: Taisetsu Tanimichi, Ibaraki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 1417 days.

(21) Appl. No.: 16/076,065

(22) PCT Filed: Jan. 31, 2017

(86) PCT No.: PCT/JP2017/003259
§ 371 (c)(1),
(2) Date: Aug. 7, 2018

(87) PCT Pub. No.: WO2017/169069
PCT Pub. Date: Oct. 5, 2017

(65) Prior Publication Data
US 2021/0179112 A1    Jun. 17, 2021

(30) Foreign Application Priority Data
Mar. 30, 2016 (JP) .................. 2016-067034

(51) Int. Cl.
*B60W 40/06* (2012.01)
*B60W 40/105* (2012.01)

(52) U.S. Cl.
CPC .......... *B60W 40/06* (2013.01); *B60W 40/105* (2013.01); *B60W 2420/22* (2013.01);
(Continued)

(58) Field of Classification Search
CPC ............ B60W 10/06; B60W 30/06; B60W 30/18027; B60W 40/06; B60W 40/105;
(Continued)

(56) References Cited

U.S. PATENT DOCUMENTS 7,949,442 B2 * 5/2011 Sheidler ................ B60K 6/485
701/55
8,140,230 B2 * 3/2012 Haggerty .............. B60W 10/06
123/192.1
(Continued)

FOREIGN PATENT DOCUMENTS

JP    2006-194360 A    7/2006
JP    2006-296135 A    10/2006
(Continued)

OTHER PUBLICATIONS

Office Action issued in corresponding Japanese patent application No. 2018-508471 dated Apr. 9, 2019 with the English translation thereof.

(Continued)

*Primary Examiner* — Lee E Rodak
*Assistant Examiner* — Martin Walter Braunlich
(74) *Attorney, Agent, or Firm* — Foley & Lardner LLP

(57) ABSTRACT

The present invention provides a vehicle control apparatus which allows a vehicle to safely negotiate a bump smoothly without feeling unusual to the driver of the vehicle. This vehicle control apparatus is characterized by comprising: a strain sensor output value acquisition unit that acquires the output value of a strain sensor (113) mounted to a drive shaft (115) for driving wheels (116); and a vehicle behavior detection unit that detects when the wheels (116) start moving on the basis of when the output value of the strain sensor decreases from the value when the wheels (116) are in the stopped state.

4 Claims, 10 Drawing Sheets

(52) U.S. Cl.
CPC ... *B60W 2420/403* (2013.01); *B60W 2552/35* (2020.02); *B60W 2720/30* (2013.01)

(58) Field of Classification Search
CPC ....... B60W 2420/22; B60W 2420/403; B60W 2552/35; B60W 2554/20; B60W 2710/0666; B60W 2720/30; F02D 29/02
See application file for complete search history.

(56) References Cited

U.S. PATENT DOCUMENTS

| | | | |
|---|---|---|---|
| 8,894,544 B2 * | 11/2014 | Gibson | B60W 10/02 477/107 |
| 2007/0061059 A1 | 3/2007 | Inoue et al. | |
| 2014/0019027 A1 * | 1/2014 | Kojima | B60L 50/16 701/102 |

FOREIGN PATENT DOCUMENTS

| | | |
|---|---|---|
| JP | 2007-077871 A | 3/2007 |
| JP | 2013-005560 A | 1/2013 |
| JP | 2013-049389 A | 3/2013 |
| JP | 2014-231789 A | 12/2014 |

OTHER PUBLICATIONS

International Search Report with English translation and Written Opinion issued in corresponding application No. PCT/JP2017/003259 dated May 9, 2017.

* cited by examiner

VEHICLE CONTROL APPARATUS

TECHNICAL FIELD

The present invention relates to a vehicle control apparatus.

BACKGROUND ART

There is a conventionally proposed speed control method in a region where a driving force and a braking force are not proportional to a speed or acceleration when the vehicle negotiates, that is, rides overs a bump or the like. The speed feedback control generally used in the speed control of the vehicle in a region like this includes a case where the speed is zero despite the application of the driving force, and thus, controls to abruptly increase the driving force so as to start the vehicle when the driving force reaches a level sufficient to negotiate the bump or the like. In this case, however, acceleration is continued until reaching a target vehicle speed by negotiating the bump and an excessive driving force is applied to a normal road surface (for example, a flat dry paved road) after negotiating the bump or the like. Therefore, it takes time to settle the speed to an appropriate speed, there was a possibility of causing the driver to feel unusual, and rapidly approaching the surrounding object.

In order to solve this problem, for example, PTL 1 proposes a technique that when it is judged that the vehicle has stopped at a bump, the applied torque is gradually increased while being suppressed, and then, the torque is decreased in a case where a start of vehicle movement is detected by the vehicle speed, so as to prevent causing the driver to feel unusual and a risk of collision due to sudden start-out of the vehicle.

CITATION LIST

Patent Literature

PTL 1: JP 2007-077871 A

SUMMARY OF INVENTION

Technical Problem

The above-described PTL 1, however, determines the start of movement of the vehicle by the vehicle speed, making it difficult to judge the start of movement of the vehicle in a case where the vehicle rides over the bump or the like by the speed with a resolution of the vehicle speed sensor, or below. In addition, when the road surface resistance is low, there might be a case where the wheel slips and rotates even when the vehicle is not moving, leading to a problem of erroneous determination of generation of a vehicle speed, causing a failure in applying appropriate torque for moving the vehicle.

The present invention has been made in view of the above point and aims to provide a vehicle control apparatus capable of negotiating, that is, riding over a bump with smooth operation and safety without causing the driver to feel unusual.

Solution to Problem

In order to solve the above problem, a vehicle control apparatus according to the present invention is characterized by including: a strain sensor output value acquisition unit that acquires the output value of a strain sensor mounted to a drive shaft for driving wheels; and a vehicle behavior detection unit that detects when the wheels start moving on the basis of when the output value of the strain sensor decreases from the value when the wheels are in the stopped state.

Advantageous Effects of Invention

According to the present invention, it is possible to calculate an appropriate driving force even in a region where wheels are caught in a bump, a slope, a slippery road surface, a hole in a road surface or the like, in which the applied driving force and speed are not proportional to each other, so as to be able to negotiate, that is, ride over the bump and start at the slope, the slippery road surface, and the hole in the road surface. Further features related to the present invention will become apparent from the description of this specification and the accompanying drawings. Problems, configurations, and effects other than in the above description will be clarified by the following embodiments.

DESCRIPTION OF EMBODIMENTS

The present invention includes a driving force detection strain sensor on a drive shaft for wheel driving so as to detect the start of movement of a vehicle from a change in a strain amount of the drive shaft detected by the strain sensor and appropriately calculate the driving force needed to move the stopped vehicle by a bump or the like.

First Embodiment

Figure 1:
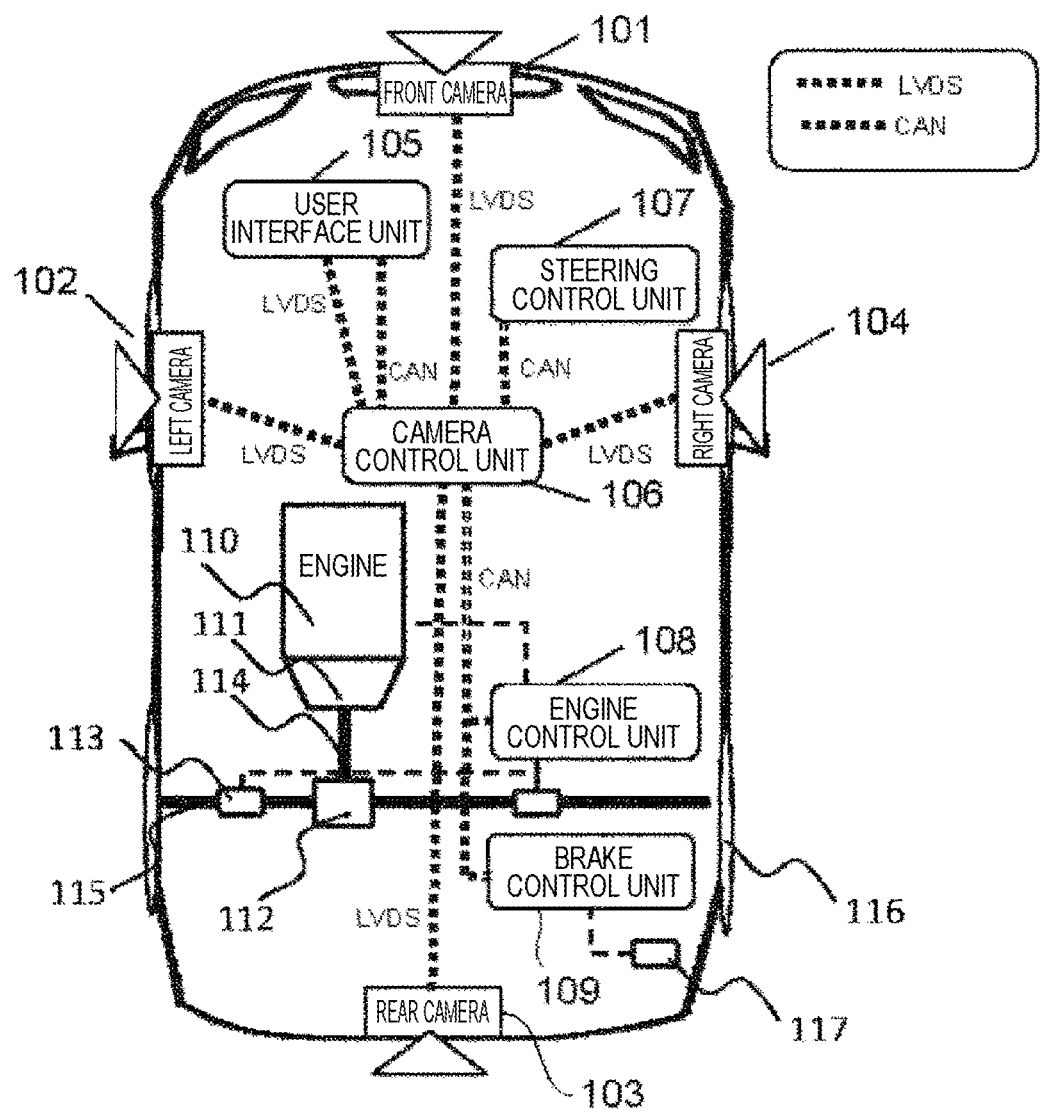
FIG. 1 is an overall system drawing.

The configuration of the entire vehicle control apparatus according to the present embodiment will be described with reference to FIG. 1 using automatic parking control as an example.

A camera control unit 106 detects an own vehicle's travelable space from the images of a front camera 101, a right camera 104, a left camera 102, and a rear camera 103. In automatic parking control, for example, the camera control unit 106 detects a parkable space and the movable space, and indicates candidate parking spots to a driver via a user interface unit 105, so as to allow the driver to select the parking spot.

When the driver has selected a parking spot, the camera control unit 106 calculates a route to the parking spot, transmits a steering angle instruction value for traveling along the route to the steering control unit 107, and transmits a braking force instruction value to a brake control unit 109, and transmits a driving force instruction value to an engine control unit 108, so as to allow the vehicle to move along the route.

With the control of an engine 110 by the engine control unit 108, the driving force generated by the engine 110 is transmitted to wheels 116 via a transmission 111, a propeller shaft 114, a differential gear 112, and a drive shaft 115 so as to move the vehicle.

The driving force applied to the wheel 116 is detected by a strain sensor 113 attached to the drive shaft 115. The detected strain value is transmitted to the camera control unit 106 via the engine control unit 108. In other words, the camera control unit 106 includes a strain sensor output value acquisition unit that acquires an output value of the strain sensor. The location where the strain sensor 113 is attached is not limited to the drive shaft 115, and may be a drive shaft that drives the wheels, including the propeller shaft 114, for example.

Moreover, calculation of the driving force instruction value by the camera control unit 106 needs a vehicle speed, and thus, a value of the wheel speed sensor 117 (wheel speed sensor value) is transmitted as the vehicle speed to the camera control unit 106 via the brake control unit 109.

Figure 2:
FIG. 2 is a diagram illustrating operation of automatic parking.
Figure 2:
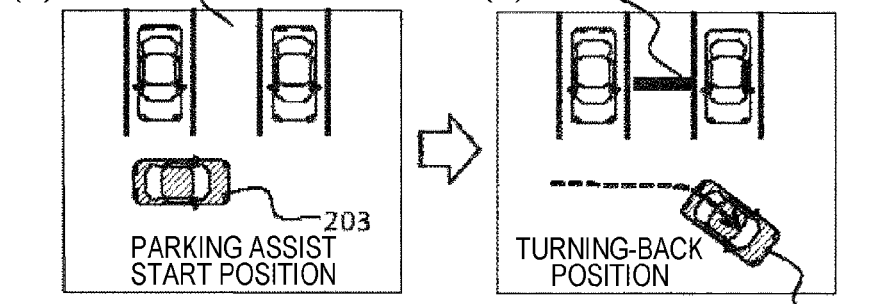
Figure 2:
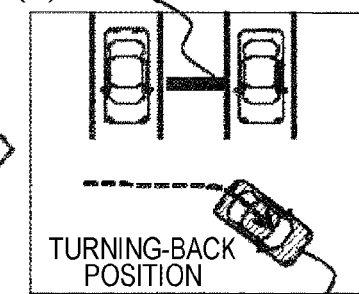
Figure 2:
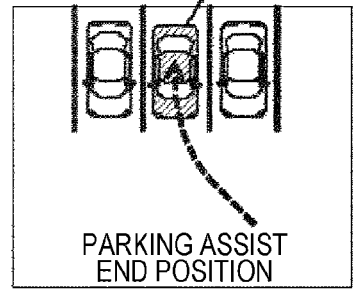

Next, the movement of the vehicle in the case of automatic parking will be described with reference to FIG. 2.

When the vehicle is stopped at the parking assist start position 203 and the driver presses the automatic parking start button of the user interface unit 105, the camera control unit 106 detects the parking space 202.

When the driver selects the parking space 202 displayed on the user interface unit 105, the camera control unit 106 controls the steering control unit 107, the engine control unit 108, and the brake control unit 109 so as to move the vehicle to a turning-back position 204.

Next, the camera control unit 106 controls the steering control unit 107, the engine control unit 108 and the brake control unit 109 again to move the vehicle to a parking end position 205. At this time, the vehicle need to move over a bump 201 such as a storage or the like of a wheel stopping bar or the like installed in a coin parking etc., in some cases.

Figure 3:
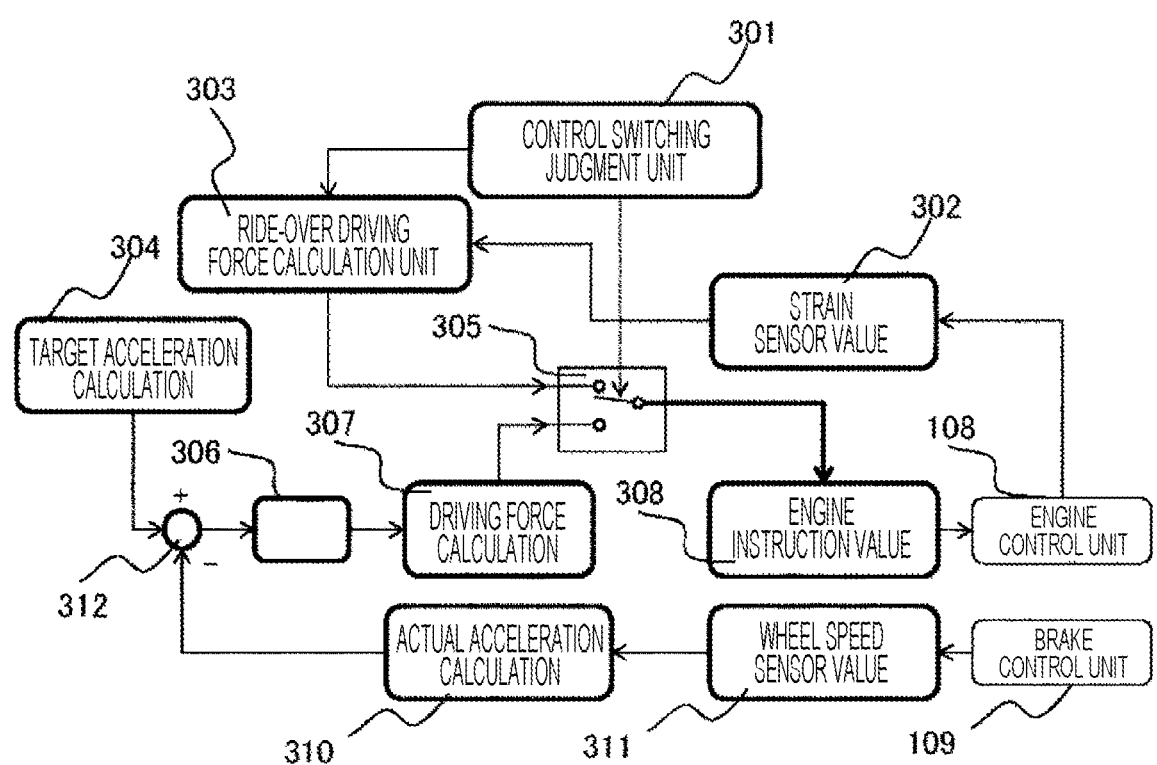
FIG. 3 is a control block diagram.

In such a case, negotiating the bump is difficult with the conventional vehicle speed control, the present invention has solved this problem with the configuration illustrated in FIG. 3.

The configuration illustrated in FIG. 3 is mounted in the camera control unit 106 and calculates the engine driving force instruction value for the engine control unit 108.

The control switching judgment unit 301 judges switching of controls between the bump ride-over control (driving force control unit) and the normal vehicle speed feedback control (vehicle speed feedback control unit). The control switching judgment unit 301 includes a bump detection unit that detects the presence of a bump on the basis of the output value of the strain sensor and performs the above switching judgment on the basis of the detection result of the bump detection unit. The bump detection unit judges that the vehicle is in contact with a bump in a case where the vehicle would not move even with application of a fixed driving force. Specifically, a necessary torque needed for a wheel to start moving from a state where the wheel is stopped on a horizontal plane is compared with a calculated torque calculated from the output value of the strain sensor. Contact of the wheel with the bump is detected on the basis of a result that the calculated torque exceeds the necessary torque.

In a case where the control switching judgment unit 301 judged that the normal vehicle speed feedback control is to be performed (where the vehicle speed feedback control unit is selected), the driving force calculated by the driving force calculation unit 307 is input to the engine instruction value 308. In contrast, in a case where it is judged that the ride-over driving force control is to be performed (where the driving force control unit is selected), the driving force calculated by a ride-over driving force calculation unit 303 is input to the engine instruction value 308.

For the driving force at the time of normal vehicle speed feedback control, the target acceleration calculation unit 304 calculates a target acceleration for moving to the parking space. In the case of automatic parking, since it is only necessary to maintain a constant speed appropriate for parking, the acceleration necessary for keeping the speed (acceleration for traveling resistance) is defined as the target acceleration. Next, a comparator 312 compares the target acceleration with an actual acceleration calculated by an actual acceleration calculation unit 310. The actual acceleration is calculated by differentiating the wheel speed sensor value 311. The wheel speed sensor value 311 is input from the brake control unit 109 as described above.

The driving force calculation unit 307 calculates the driving force by multiplying a difference between the target acceleration and the actual acceleration calculated at the comparator 312, by a gain 306.

In contrast, in a case where the control switching judgment unit 301 has selected the bump ride-over control, the bump ride-over driving force calculation unit 303 calculates the driving force. A method for calculating this will be described with reference to FIG. 5.

In a case where the bump ride-over control is selected, the processing starts from a processing start (501). Driving force initialization (502) is first executed, and the driving force is defined as Fx.

Next, the driving force is gradually increased by driving force increase (503). With the start of a decrease in the strain sensor value (504), driving force retention (505) is performed. That is, the driving force is increased until the strain sensor value starts to decrease. The driving force at the start of decrease of the strain sensor value is retained. The camera control unit 106 includes a torque instruction unit that instructs a drive torque to be supplied to the drive shaft, and a vehicle behavior detection unit that detects the start of movement of the wheel on the basis of a result of the output value of the strain sensor 113 that has decreased from the value in the stopped state of the wheel 116. The torque instruction unit increases the instruction value of the drive torque in a state where the wheel is stopped. In a case where the calculated torque exceeds the necessary torque, the torque instruction unit retains the instruction value of the drive torque. The vehicle behavior detection unit detects the start of movement of the wheel on the basis of the result that the output value of the strain sensor has changed from increase to decrease.

In a case where the strain sensor value has increased again (506) after the driving force retention (505), the processing turns to the driving force increase (503) again. This is because it is necessary to further apply the driving force in a case where the driving force needed to negotiate the bump is insufficient.

For example, in a case where the vehicle speed becomes greater than zero (507) in a state where the driving force is retained, the driving force is initialized to zero and the processing is finished (508).

In another case where the driving force exceeds a fixed value Fh while the driving force is increasing (509), it is judged that the vehicle is stopped at a bump the vehicle cannot negotiate, and the driving force is initialized to finish the processing.

The height of the bump that cannot be negotiated by the vehicle is determined in advance. When the height is h, the threshold Fh can be obtained from the following Formula (1).

[Mathematical Formula 1]

$$Fh = \frac{mg\sqrt{h(2r-h)}}{(r-h)} \quad (1)$$

where, m: vehicle weight, g: gravitational acceleration, h: bump threshold, and r: radius of tire.

Figure 4:
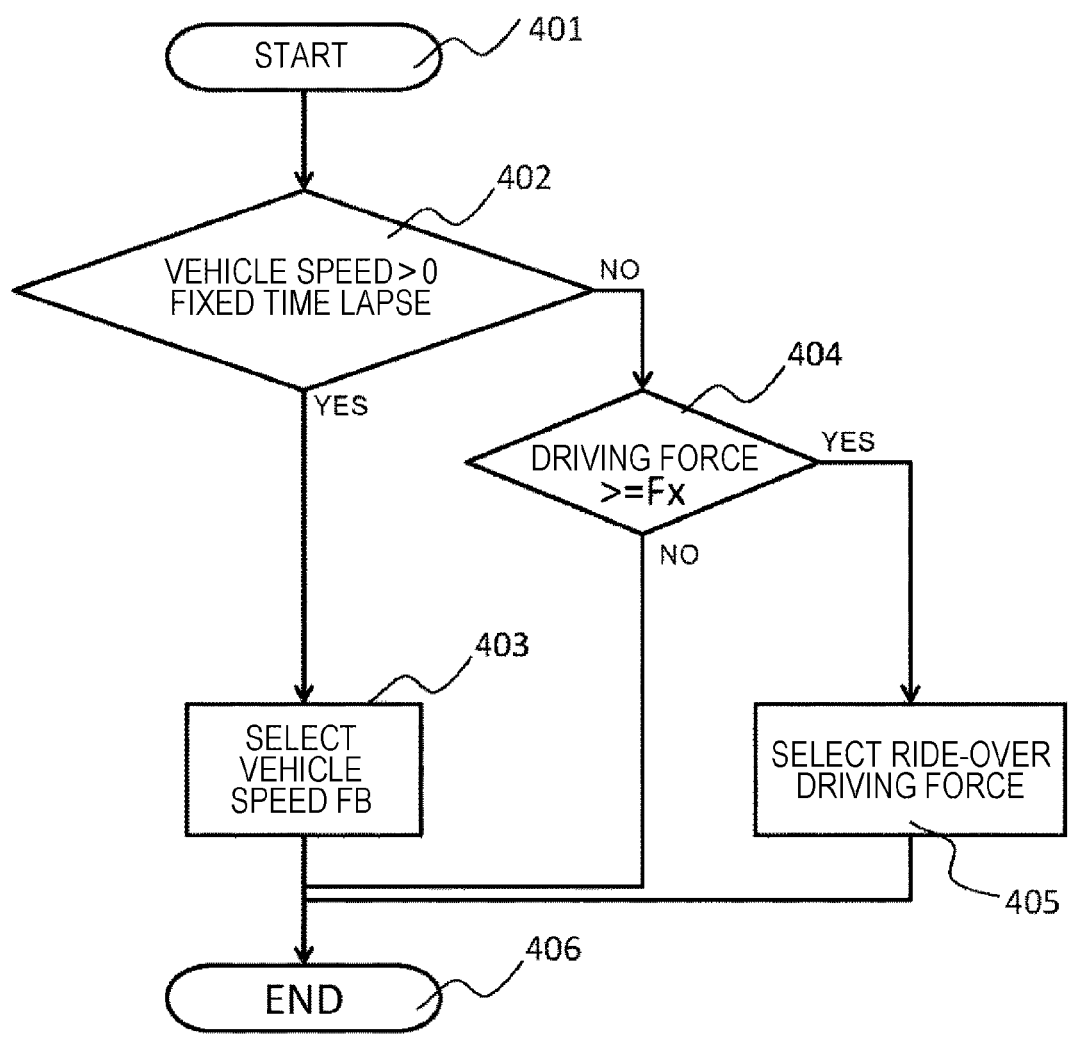
FIG. 4 is a flowchart illustrating processing at a control switching judgment unit.

Next, processing in the control switching determination unit 301 will be described with reference to FIG. 4.

When the processing is started (401), it is confirmed that the vehicle speed is greater than zero (402). In a case where the vehicle speed is greater than zero, it is judged that there is no stoppage of the vehicle by the bump, and the vehicle speed feedback control (403) is selected.

In a case where the vehicle speed is zero or below, it is judged that there is a possibility of stoppage of the vehicle due to the bump, and it is confirmed whether the driving force is a fixed value Fx or more (404). In a case where the result is that the driving force is the fixed value Fx or more (Yes in 404), it is judged that there is stoppage of vehicle due to the bump despite the application of the driving force, and a ride-over driving force control 405 is selected (switching from control by the vehicle speed feedback control unit to the control by the driving force control unit). The threshold set as the fixed value is a driving force needed to maintain a fixed vehicle speed or more by the vehicle. When the vehicle speed does not change from zero despite the application of the driving force (when the vehicle speed is zero or less), it is judged that the movement of the vehicle is suspended by the bump, leading to the stoppage of the vehicle.

The driving force Fx needed to maintain a fixed vehicle speed or above by the vehicle can be obtained from the following Formula (2).

[Mathematical Formula 2]

$$Fx = ma_r + \alpha \quad (2)$$

where, m: vehicle weight, $a_r$: acceleration of traveling resistance, and α: tuning constant.

Next, an overall motion when the wheel of the vehicle negotiates the bump will be described with reference to FIG. 6.

First, a target acceleration 601 is increased to a level that allows the vehicle to start movement. This also increases a driving force instruction value 602 up to a driving force level that allows the vehicle to start movement.

Figure 6:
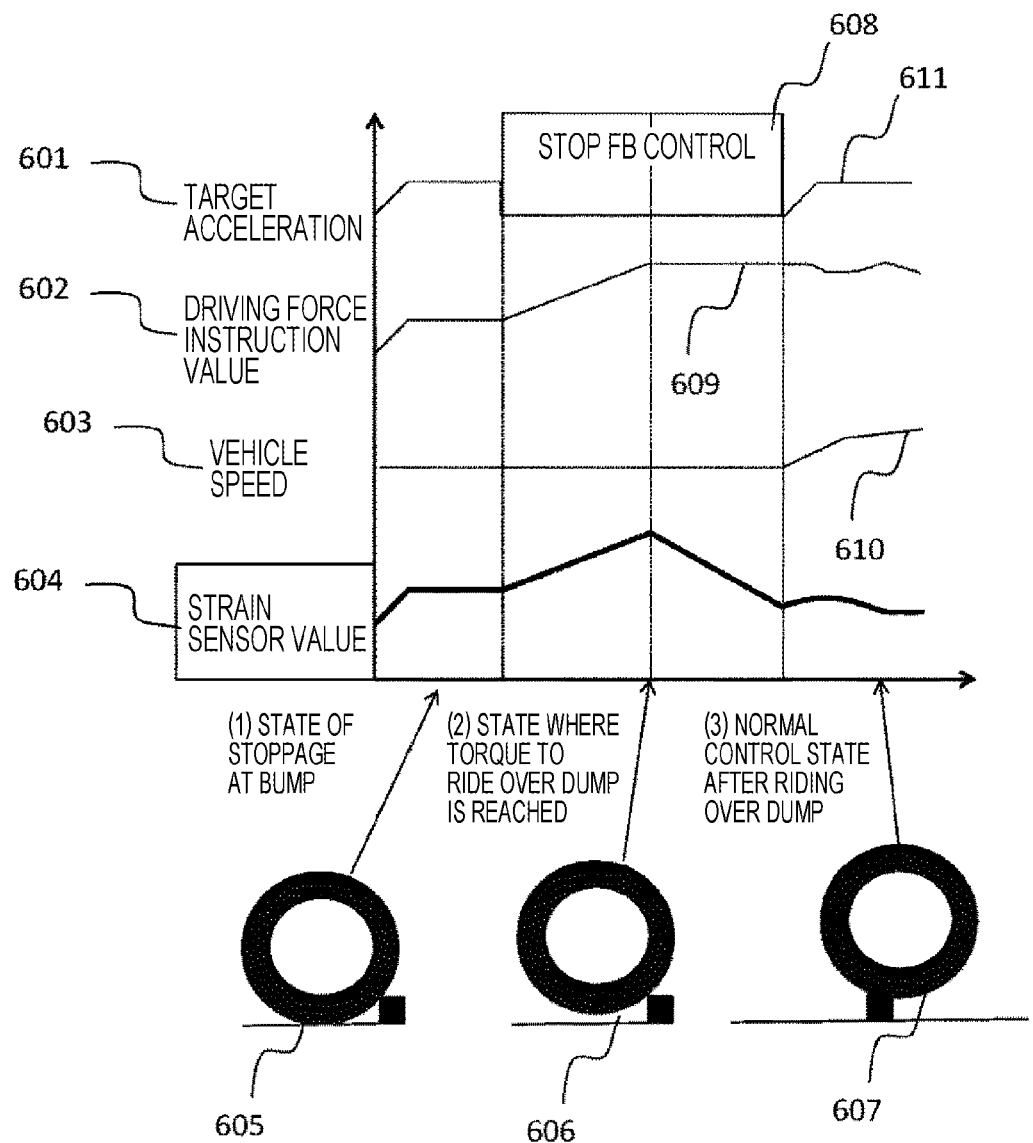
FIG. 6 is a diagram illustrating system operation.

At this time, in a case where there is a bump as illustrated in (1) (605) of FIG. 6, the vehicle speed (603) would remain at zero. When a fixed time has elapsed in this state, the feedback control is stopped (608), and the driving force instruction value (602) is gradually increased and together with this, the strain sensor value (604) also increases in proportion to the driving force instruction value.

Thereafter, as illustrated in (2) of FIG. 6, when the wheel starts to ride over the bump (606), the strain sensor value (604) starts to decrease. Since the driving force at the time when the strain sensor value (604) starts to decrease is a torque needed to negotiate the bump, the driving force instruction value 602 at this time is retained (609).

Continuation of retention of the driving force instruction value 602 allows the wheel to ride over the bump (607), the vehicle speed is detected (607), and thus, the vehicle speed feedback control is restarted (611).

With this configuration, it is possible to safely negotiate, that is, ride over the bump without causing the driver to feel unusual.

Second Embodiment

Next, an embodiment for dealing with a slippery road surface will be described.

Figure 7:
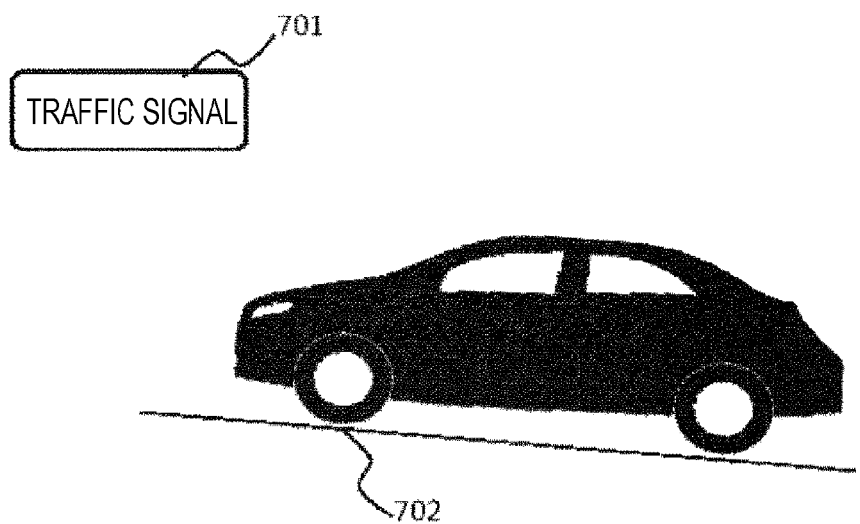
FIG. 7 is a diagram illustrating an exemplary vehicle situation on a slippery road surface.

For example, as illustrated in FIG. 7, there is a case where the wheels idle and cannot start in case where vehicle start is attempted in a situation where the vehicle is stopped in front of a traffic signal 701 and where the road surface 702 is slippery. An application example of the present invention to such a case will be described below.

Figure 8:
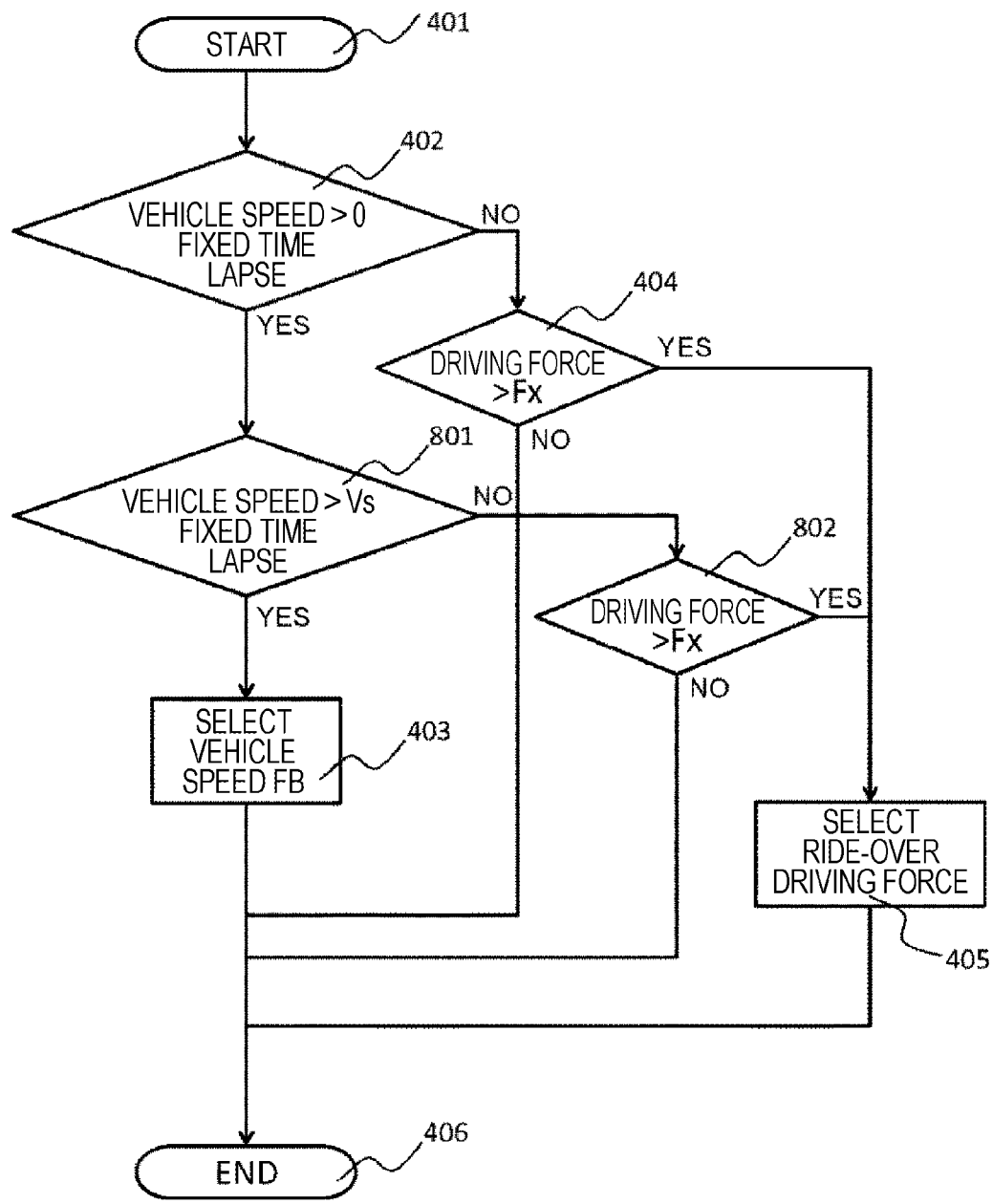
FIG. 8 is a flowchart illustrating processing of a bump ride-over judgment unit corresponding to a slippery road surface.

FIG. 8 illustrates a configuration of a control switching judgment unit for dealing with a slippery road surface.

A judgment unit 801 for slip detection is provided next to the judgment unit 402 for bump detection. The judgment unit 801 checks whether a state in which the vehicle speed (wheel speed sensor value) is higher than a threshold Vs continues for a fixed lapse of time or more. The threshold Vs is a value greater than the vehicle speed expected to be generated by the driving force Fx initially input, and is a vehicle speed (vehicle speed higher than usual) generated when the wheel idles due to slip or the like. Then, when a vehicle speed not matching a fixed driving force is detected, it is judged that slipping occurs in the wheel.

Moreover, this slip detection may be detected from a vehicle speed difference in the drive wheels and the non-drive wheels. Since only the drive wheels idle and the non-drive wheels do not rotate on a slippery road surface, it is possible to detect the wheel idling from the difference in rotation.

Next, it is confirmed in 802 that the driving force applied to the wheel is greater than the threshold Fx. In a case where the driving force is greater than the threshold, the ride-over driving force control 405 is selected. Here, it is confirmed that the reason for the wheel rotation is application of the driving force.

Figure 5:
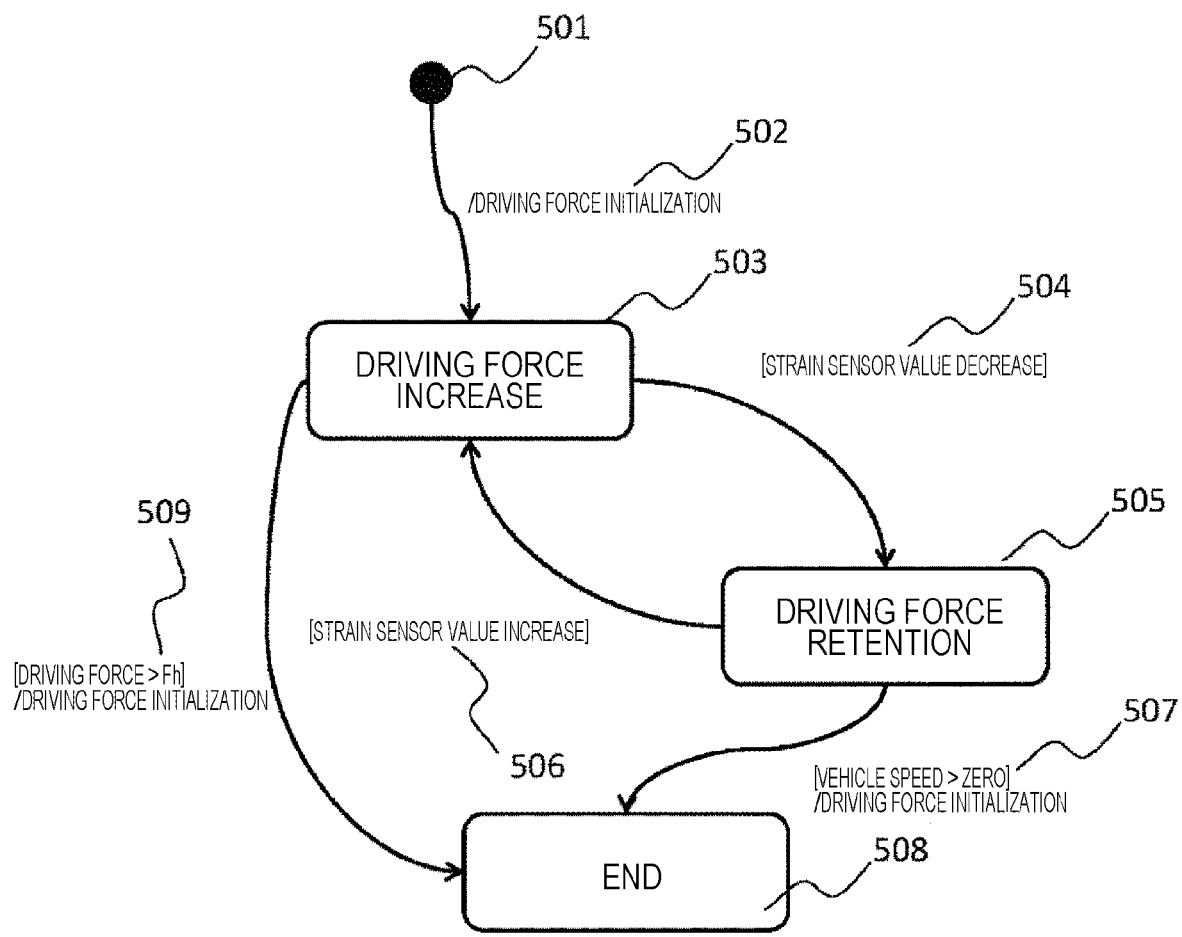
FIG. 5 is a diagram illustrating processing in a bump ride-over driving force calculation unit.
Figure 9:
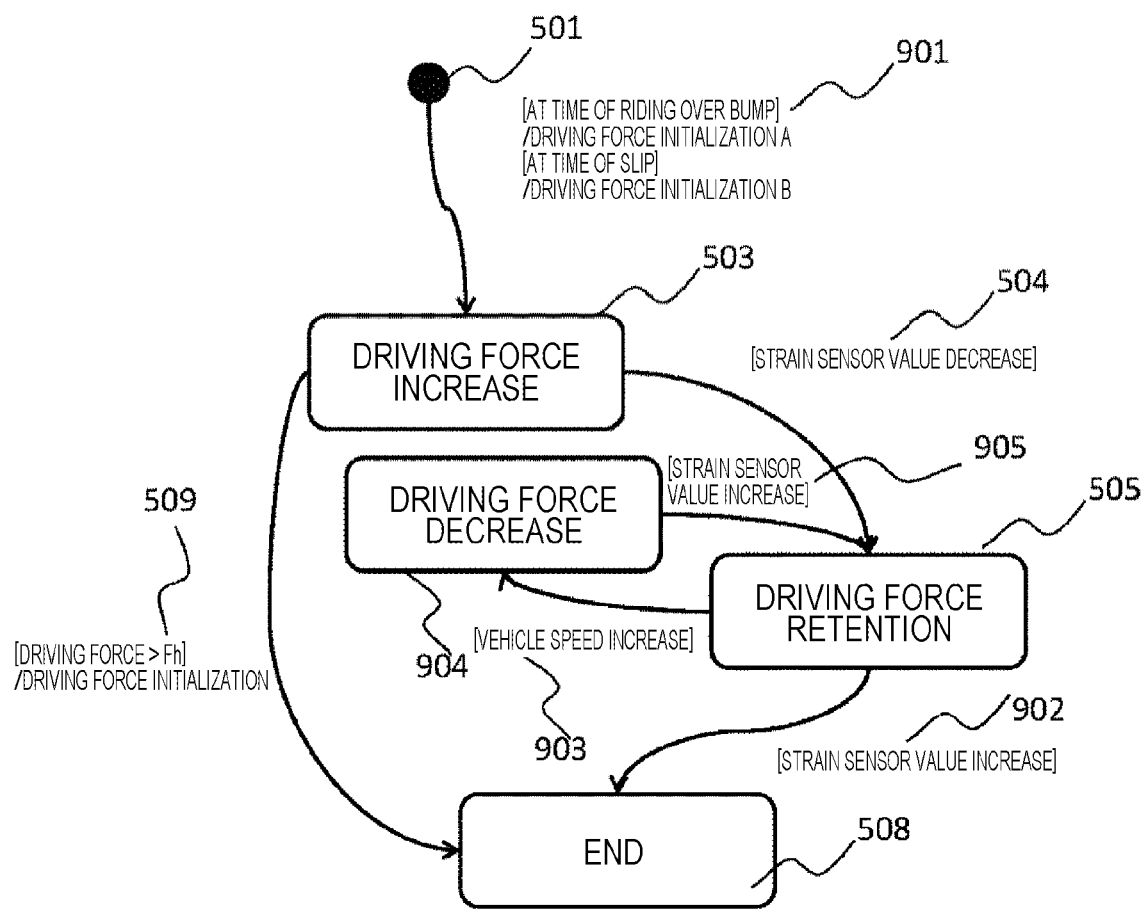
FIG. 9 is a diagram illustrating processing in a bump ride-over driving force calculation unit corresponding to a slippery road surface.
Figure 10:
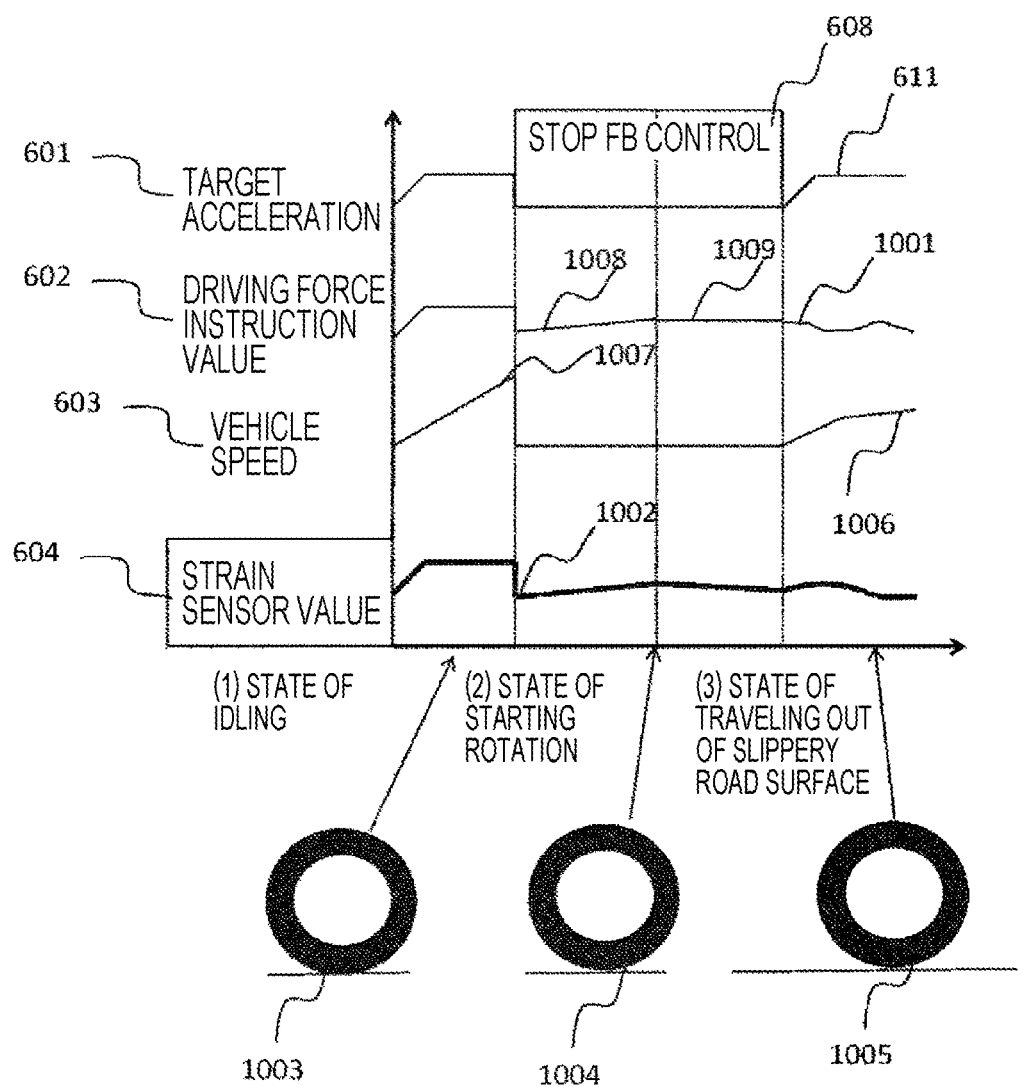
FIG. 10 is a diagram illustrating operation on a slippery road surface.

FIG. 9 illustrates processing in the ride-over driving force calculation unit 303 when the road surface is slippery. The difference from the first embodiment illustrated in FIG. 5 is in processing 901, 902, 903, 904, and 905, for which description will be given.

First, driving force initialization (901) will be described. At the time of handling a slippery road surface, initialization is performed with a driving force initialization value B smaller than the value at the time of riding over the bumps. While an initial value A being Fx at the time of riding over the bump is the driving force necessary for the vehicle to start moving on a normal road surface, applying a driving force of this magnitude would cause idling of the wheels.

Accordingly, a value small enough to suppress idling of the wheels even on a slippery road surface is set as a driving force initial position B.

At the strain sensor value increase (902), the driving force retention (505) allows the vehicle to travel out of the slippery road surface, so as to increase the resistance of the road surface, resulting in an increase in the strain sensor value. In this case, it is judged that the vehicle has gone out of the slippery road surface, and the processing proceeds to End (508).

In a case where the vehicle speed is increased (903) during the driving force retention (505), it is judged that the applied driving force is high and the driving force decrease processing (904) is performed. When the strain sensor value is increased (905), it is judged that the slip of the wheel is settled and processing returns to driving force retention (505).

Next, the behavior on the slippery road surface will be described with reference to FIG. 6.

First, target acceleration 601 is increased to a level that allows the vehicle to start movement. Then, the vehicle speed (wheel speed sensor value) 603 abruptly increases (1007). In response to abrupt increase of the vehicle speed 603, the control switching judgment unit 301 performs a slip judgment, and the control is switched to the ride-over driving force calculation unit 303. When the control is switched to the driving force calculation unit 303, the driving force instruction value 602 gradually increases the driving force starting from a low value as in 1008. With this, the strain sensor value 604 also gradually increases (1002). When the wheels starts rotation (1004), the strain sensor value 604 decreases. The driving force at the moment wheels start rotation is the driving force to rotate the wheels without causing slipping of the wheels, and thus, the driving force is retained (1009).

Thereafter, the wheel travels out of the slippery road surface (1005). When the strain sensor value 604 starts to increase, the feedback control is restarted to return to normal control (611).

In this manner, with retention of the driving force to a level that can suppress slipping of the wheel even on a road surface slippery for the wheel, the wheel can travel out of such a road surface, making it possible to start a vehicle even when the vehicle in the situation as illustrated in FIG. 7.

In the case of a slippery road surface for the wheels, there is a case where not all the drive wheels idle. For example, in the case of two-wheel drive, there might be a case where the left wheel idles while the right wheel does not idle. In such a case, there is a possibility that the vehicle speed does not exceed the threshold Vs of the judgment unit 801 in FIG. 8 even idling occurs in the wheel. Assuming such a case, select-high (the highest vehicle speed) of the vehicle speed for each of the drive wheels is used as the vehicle speed used by the judgment unit 801. In a case where a wheel slip occurs and only a certain wheel idles, the wheels except the idling wheel would not rotate due to an action of a differential gear. Accordingly, the highest vehicle speed among the individual wheel speeds is the wheel speed sensor value of the idling wheel. Consequently, it is only required to detect the idling due to the slip on the basis of the wheel speed sensor value.

After the idle is detected, since the idling wheel is the wheel most likely to slip, control is executed using the value of the strain sensor mounted on the drive shaft of the wheel, making it possible to perform appropriate control even in a situation where only a portion of the wheels idles.

As above, embodiments of the present invention have been described. The present invention is not limited to the above-described embodiments but may include various design modifications without departing from the spirit of the present invention described in claims. For example, the above-described embodiments give detailed explanation just to allow the present invention to be clearly understood. Therefore, the present invention is not limited to the case having all of components in the configuration. In addition, a part of configuration of an embodiment can be replaced with a part of configuration of another embodiment. A part of the configuration of another embodiment can be added to a certain embodiment. Furthermore, it is possible to modify a portion of the configuration of each of the embodiments, such as addition, deletion, and replacement from another configuration.

REFERENCE SIGNS LIST

106 Camera control unit
108 Engine control unit
109 Brake control unit
113 Strain sensor
115 Drive shaft (drive shaft)
116 Wheel
117 Wheel speed sensor
301 Control switching judgment unit
302 Strain sensor value
303 Ride-over driving force calculation unit
310 Actual acceleration calculation unit

The invention claimed is:

1. A vehicle control apparatus comprising:
a strain sensor processor configured to acquire an output value of a strain sensor mounted to a drive shaft for driving wheels;
a vehicle behavior detector configured to detect when the wheels start moving on a basis of when the output value of the strain sensor decreases from a value when the wheels are in a stopped state; and
a torque controller configured to control a drive torque to be supplied to the drive shaft, wherein:
the torque controller increases an instruction value of the drive torque in a state where the wheels are stopped,
the vehicle behavior detector detects start of movement of the wheels based on a change of the output value of the strain sensor from increase to decrease,
the torque controller stops an increase in the instruction value of the drive torque when the vehicle behavior detector detects start of movement of the wheels and the output value of the strain sensor changes from increase to decrease, and
the torque controller maintains the instruction value of the drive torque when the vehicle behavior detector detects start of movement of the wheels and the output value of the strain sensor changes from increase to decrease.

2. The vehicle control apparatus according to claim 1, further comprising a bump detector configured to detect a presence of a bump on the basis of the output value of the strain sensor,
wherein the bump detector compares a necessary torque needed for the wheels to start moving from the state where the wheels are stopped on a horizontal plane with a calculated torque calculated from the output value of the strain sensor, and detects a contact of the wheels with the bump on the basis of a result that the calculated torque exceeds the necessary torque.

3. The vehicle control apparatus according to claim 2, wherein in a case where the calculated torque exceeds the necessary torque, the torque controller retains the instruction value of the drive torque.

4. The vehicle control apparatus according to claim 2, further comprising a slip detector configured to detect if the wheels are slipping based on a wheel speed sensor value of a wheel speed sensor configured to measure a wheel speed of the wheels, wherein:

when the slip detector detects the wheels slipping, the torque controller decreases the instruction value of the drive torque to an initial torque below the necessary torque, and when the slip detector detects the wheels not slipping, the torque controller increases the instruction value of the drive torque above the initial torque.

\* \* \* \* \*